United States Patent [19]
Lewis

[11] Patent Number: 5,841,116
[45] Date of Patent: Nov. 24, 1998

[54] METHOD AND SYSTEM FOR IDENTIFYING PERSONAL POSSESSIONS

[75] Inventor: Bruce Lewis, North York, Canada

[73] Assignee: The Tracker Corporation, Toronto, Canada

[21] Appl. No.: 581,602

[22] PCT Filed: May 13, 1994

[86] PCT No.: PCT/CA94/00268

§ 371 Date: Jan. 18, 1996

§ 102(e) Date: Jan. 18, 1996

[87] PCT Pub. No.: WO95/03591

PCT Pub. Date: Feb. 2, 1995

[30] Foreign Application Priority Data

Jul. 19, 1993 [GB] United Kingdom ............... 9314894

[51] Int. Cl.⁶ ........................................... G06K 5/10
[52] U.S. Cl. ................................. 235/375; 235/380
[58] Field of Search ........................... 235/375, 462, 235/468, 380, 385

[56] References Cited

U.S. PATENT DOCUMENTS

| | | | |
|---|---|---|---|
| 1,372,036 | 3/1921 | Olsen | 283/70 |
| 5,036,610 | 8/1991 | Fehr | 40/300 |
| 5,083,814 | 1/1992 | Guinta et al. | 166/246 |
| 5,180,192 | 1/1993 | Herbert | 235/382.5 |
| 5,243,655 | 9/1993 | Wang | 235/462 |
| 5,337,361 | 8/1994 | Wang et al. | 235/462 |
| 5,514,860 | 5/1996 | Berson | 235/468 |
| 5,521,815 | 5/1996 | Rose, Jr. | 364/409 |
| 5,521,984 | 5/1996 | Denenberg et al. | 382/209 |

FOREIGN PATENT DOCUMENTS

| | | |
|---|---|---|
| 0512413 | 11/1992 | European Pat. Off. . |
| 2146674 | 6/1990 | Japan . |
| 2212310 | 7/1989 | United Kingdom . |

*Primary Examiner*—Donald T. Hajec
*Assistant Examiner*—Mark Tremblay
*Attorney, Agent, or Firm*—Webb Ziesenheim Bruening Logsdon Orkin & Hanson, P.C.

[57] ABSTRACT

Bar code labels, each bearing a pre-identified insignia, each insignia corresponding to a unique owner, are affixed to the personal possessions of a number of owners. A set of owner identifiers are stored in a first location wherein each owner identifier corresponds to a unique owner. For each owner identifier stored, a set of identifying data is also stored. Each identifying data corresponds to one of the set of bar code labels. At a second location, remote from the first, identifying data corresponding to the identifying insignia on one of the labels is input by scanning the bar code. The input identifying data is transmitted to the first location and compared with one or more of the set of identifying data stored at the first location. If the input identifying data matches one of the set of identifying data, the owner identifier is retrieved and displayed.

30 Claims, 3 Drawing Sheets

METHOD AND SYSTEM FOR IDENTIFYING PERSONAL POSSESSIONS

FIELD OF THE INVENTION

This invention relates to a method and system for identifying personal possessions and the ownership thereof, and more particularly to a method and system for electronically assembling and correlating such identifying information.

BACKGROUND OF THE INVENTION

The theft or loss of personal possessions, or items, that are unmarked and non-unique can create difficulties for both the original owners of the items and those that find or recover such items.

In many cases lost or stolen articles, or items, are recovered by police or other public authorities but cannot be returned to the owners of the articles because ownership of the articles cannot be determined. In other words, the personal possessions cannot be accurately identified. The inability to track down the owners of recovered articles results in warehousing and other administrative costs which must be borne by the police or the public authority involved. The owner of the item will often remain unaware that the item has been found and is available to be recovered by the owner.

One method used to identify personal possessions is to label the items with the name and address of the owner. This has the disadvantage that the address of the owner may change and the labels will therefore be incorrect. To avoid this, the labels may be updated when the owner of the items changes addresses but such an operation is inconvenient and time consuming. This is difficult to achieve and may be awkward where the labels are lost or difficult to obtain. Some labels are difficult to apply to certain surfaces or may become illegible if damaged.

A related problem in identifying items arises when an item is lost or stolen and an insurance claim is made. An estimate of the value of the item is typically provided to the insurer by the owner. The value indicated in the insurance claim is typically chosen at the discretion of the owner and the insurance adjuster must make inquiries to determine the accuracy of both the estimated value of, and the exact identity of, the lost or stolen item.

Therefore a method and a system for identifying ownership of personal possessions which is straightforward to carry out, which require no updating of information on the possessions and which permit the secure retention of an accurate description of the possessions are desirable.

SUMMARY OF THE INVENTION

It is an object of one aspect of the present invention to provide an improved method and system for identifying personal possessions.

According to the present invention, a method is provided to permit the ownership of a lost or stolen item to be determined (i.e. the ownership of the personal possession to be identified). The method also provides the ability to maintain accurate information regarding items which may become lost or stolen and for which an insurance claim may be made.

According to an aspect of the present invention there is provided a system for identifying personal possessions belonging to a plurality of owners, comprising a set of labels, each label bearing a predetermined identifying insignia, each insignia corresponding to a unique owner, means for affixing selected ones of the set of labels to selected ones of the personal possessions, means for storing, at a first location, a set of owner identifiers for the plurality of owners, each owner identifier corresponding to a unique owner and for each owner identifier stored, a set of insignia data records, each insignia data record corresponding to one of the set of labels, means for inputting, at a second location remote from the first, identifying data corresponding to the identifying insignia on a selected one of the set of labels affixed to a personal possession, means for receiving the identifying data at the second location and transmitting the identifying data to the first location, means for receiving the identifying data at the first location, means for comparing the identifying data with the insignia data records stored in the means for storing at the first location and where the identifying data matches one of the insignia data records, retrieving the owner identifier corresponding to the insignia data record means for displaying the retrieved owner identifier.

According to a second aspect of the present invention there is provided a method for identifying personal possessions belonging to a plurality of owners, comprising the steps of:

A. providing a set of labels, each label bearing a predetermined identifying insignia, each insignia corresponding to a unique owner, B. affixing selected ones of the set of labels to selected ones of the personal possessions, C. storing, at a first location, a set of owner identifiers for the plurality of owners, each owner identifier corresponding to a unique owner and for each owner identifier stored, storing a set of insignia data records, each insignia data record corresponding to one of the set of labels, D. inputting, at a second location remote from the first, identifying data corresponding to the identifying insignia on a selected one of the set of labels affixed to a personal possession, E. receiving the identifying data at the second location and transmitting the identifying data to the first location, F. receiving the identifying data at the first location, G. comparing the identifying data with the insignia data records stored in the means for storing at the first location and where the identifying data matches one of the insignia data records, retrieving the owner identifier corresponding to the insignia data record H. displaying the retrieved owner identifier.

Advantages of the present invention are that personal possessions which are located after being stolen or lost are able to be quickly matched with the owners of the possessions. An advantage of an embodiment of the present invention is that the information identifying the owner of the possessions is maintained in a secure manner. A further advantage of an embodiment is that the identification of the owner may be made from a remote location relative to the storage of the identifying information.

BRIEF DESCRIPTION OF THE DRAWINGS

A detailed description of the preferred embodiment is provided herein below with reference to the following drawings, in which FIG. 1, in a schematic representation, shows the configuration of the system of the preferred embodiment.

DETAILED DESCRIPTION OF THE PREFERRED EMBODIMENT

Figure 1:
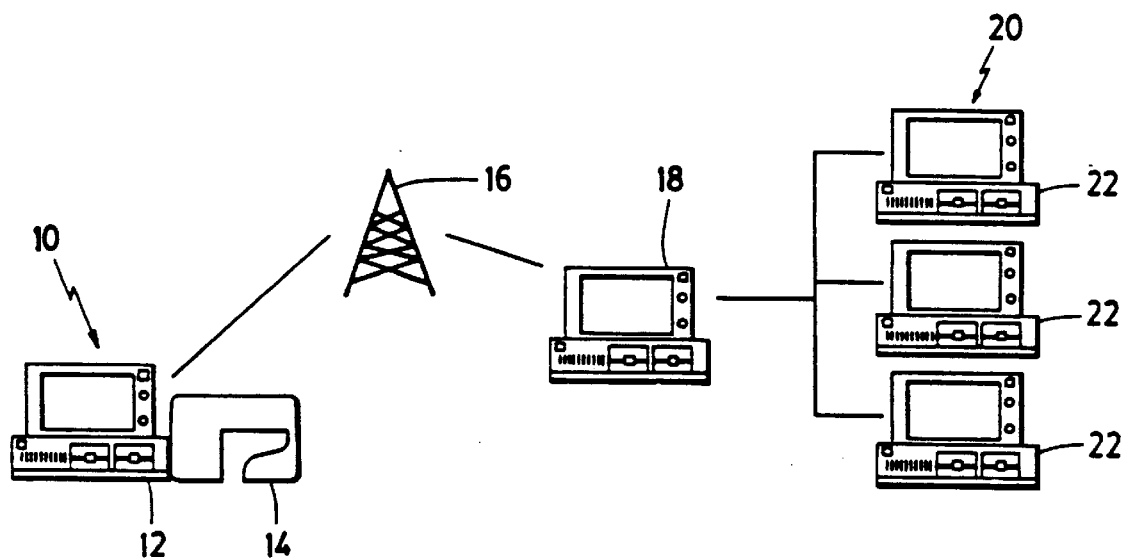

Turning to FIG. 1, there is illustrated in a schematic representation, the configuration of the system of the preferred embodiment. The system of the preferred embodiment has a number of remote systems, one of which is illustrated in Figure one as remote system 10 having a computer 12 and a scanning device 14. The remote system 10 is connected to a communications network 16 to a host system 18. The host system 18 is connected to a member services computer system 20 comprising individual computers 22. Optionally, the computers 22 may be replaced by terminals connected to host system 18.

Figure 2:
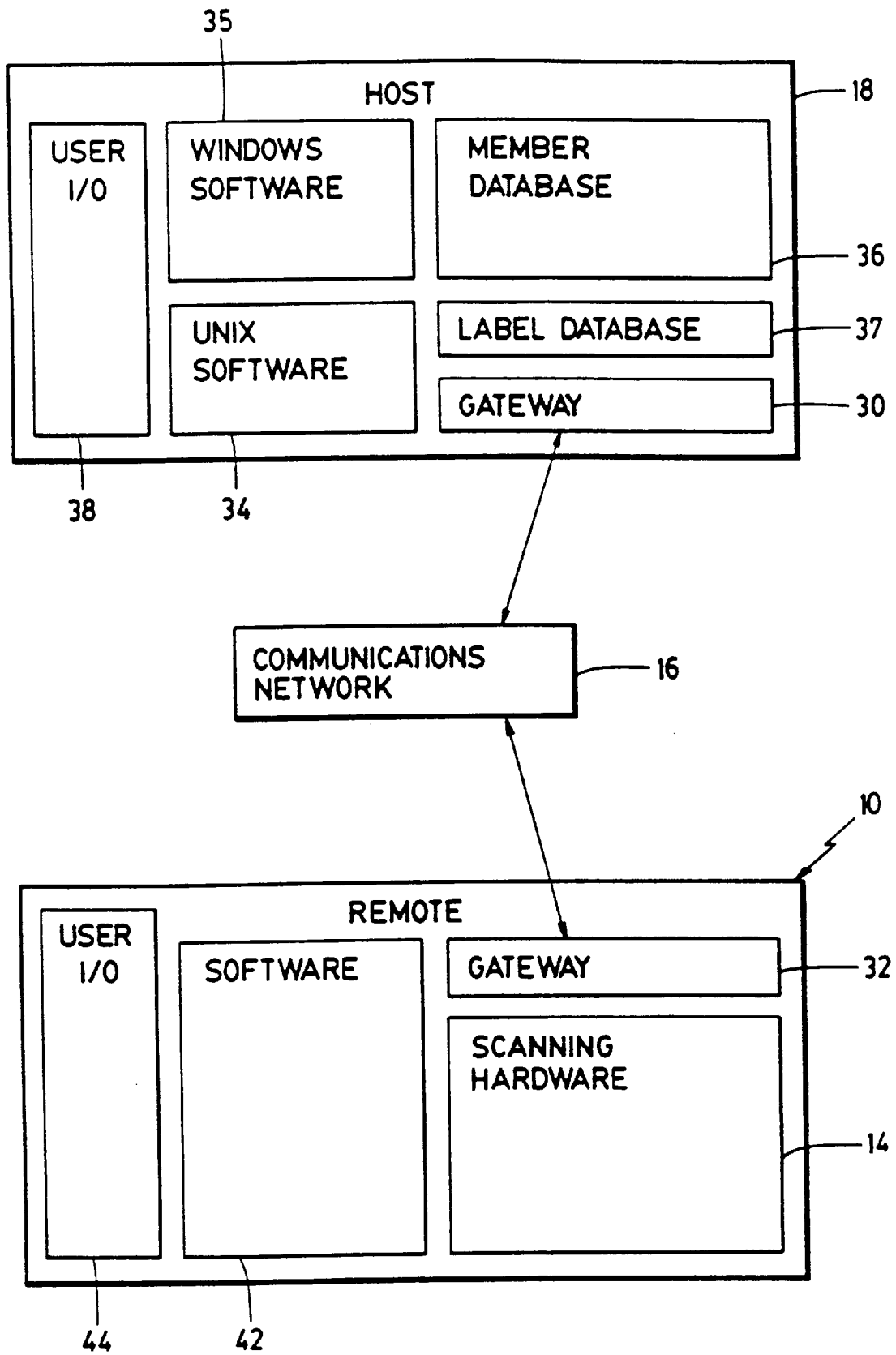
FIG. 2, in a block diagram view, shows the functional components of the system of FIG. 1.

With respect to FIG. 2, there is illustrated in a block diagram view, the functional components of the system of FIG. 1. The remote system 10 is shown connected to the host system 18 by way of communications network 16. In the preferred embodiment of the invention the host system 18 runs a UNIX operating system and the host system 18 contains a gateway 30 which provides the connection to the communications network 16 for the host system 18. In the preferred embodiment the gateway is a X.25 hardware circuit board which connects the UNIX operating system's multi-user communications capabilities to the local data line. The gateway provides for an unlimited number of virtual circuit connections and handles the packet switching and routing of data files received from the communications network. The UNIX functionality provides file reads from and writes to up to 128 simultaneous data circuits. A real time connection is established for inbound and outbound file transfer over each circuit.

The gateway 32 in the remote system 10 is a modem (and related software) which is able to receive and transmit data over the communications network 16 for delivery to the host system 18 via the gateway 30. The modem may permit either radio frequency (RF) or wire line communication.

The host system 18 contains within it UNIX software 34, WINDOWS software 35, member database 36 and label database 37. It will be understood by those skilled in the art that the UNIX software 34 and the WINDOWS software 35 of the preferred embodiment may be replaced by other appropriately selected software or software and hardware having the same or similar functions. The UNIX software 34 is software which runs under the UNIX operating system, or variants of that operating system. The WINDOWS software 35 is software which runs in the Microsoft Windows environment.

The member database 36 contains data relating to the identity of the members of the system, including the unique identifier for each member (the member number). The label database 30 contains bar code data as well as the unique member identifier (member number). In the preferred embodiment, the databases 36, 37 are implemented using a relational database model, both databases keyed on member number. As will be apparent to one skilled in the art, other database models may be used to provide the same functionality as the relational database models used in the preferred embodiment.

The WINDOWS software 35 enables the host system 18 to access the member database 36 as set out below. The UNIX software 34 provides access to the label database 37.

Control for the host system 18 is provided by way of user input/output (I/O) 38. In the preferred embodiment the user I/O 38 is provided by way of a keyboard and CRT screen. Other alternatives are possible, including voice recognition systems, touch screens and other commonly available user I/O systems.

The remote system 10 contains scanning hardware 14 and software 42 which is used to manage the receipt and transmission of data from the remote system 10. Control of the remote system 10 is provided by user input/output (I/O) 44.

The scanning hardware 14 is preferably a hand held scanning unit able to read a bar code. The user I/O 44 is preferably a keyboard or keypad coupled with a LCD or CRT display. Other commonly available user I/O alternatives are contemplated.

Figure 3:
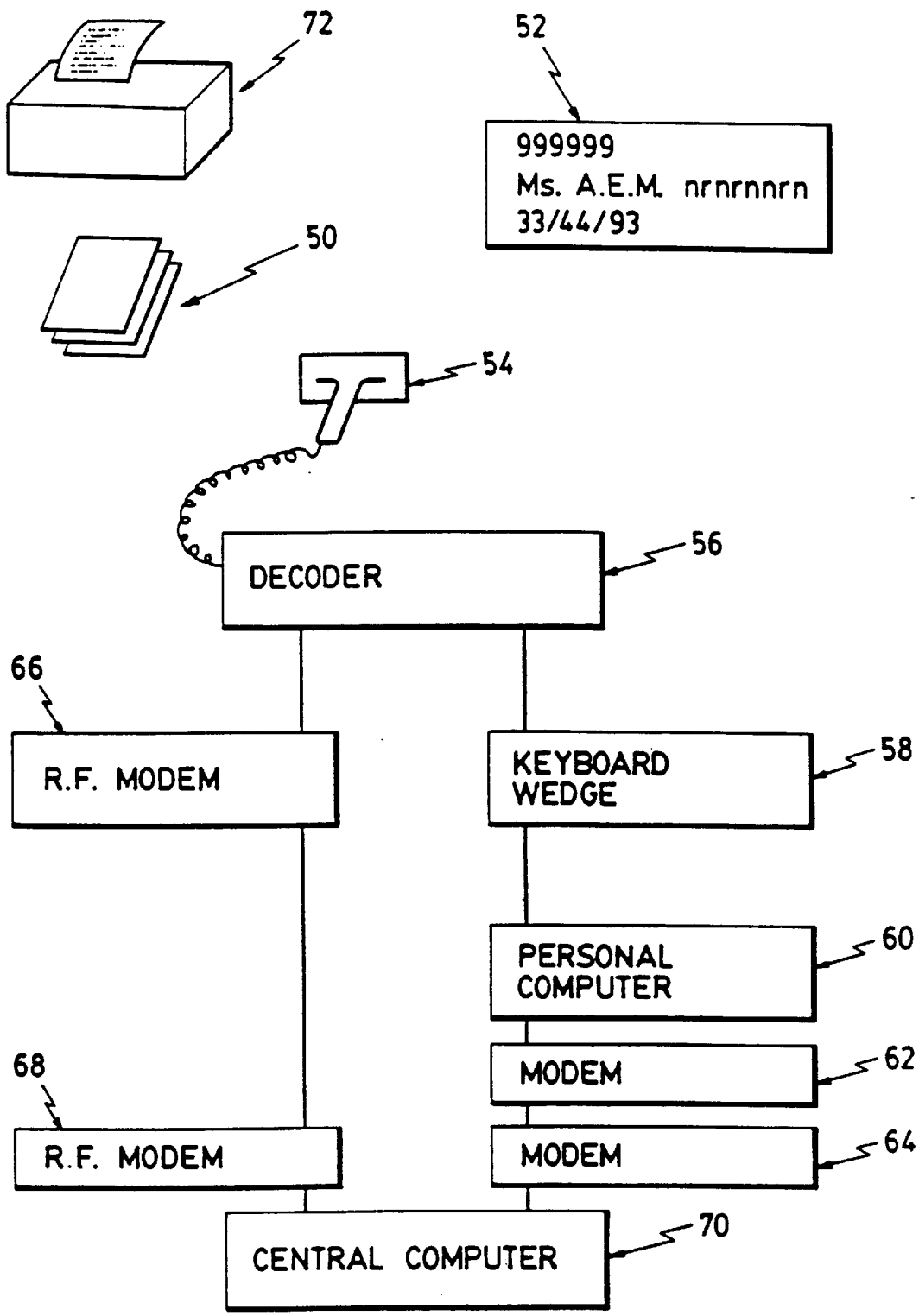
FIG. 3, in a schematic representation, shows the data interconnections of the system of FIG. 1.

Turning to FIG. 3, a set of bar code labels 50 is shown, as well as a identification card 52. Also illustrated in FIG. 3 is an optical bar code scanner 54, a decoder 56, a keyboard wedge 58, a personal computer 60, modems 62 and 64, radio frequency modems 66 and 68, and a central computer 70. Although in FIG. 3 the decoder 56 is shown connected to both radio frequency modem 66 and keyboard wedge 58, in practice the decoder 56 would be connected to one or the other of modem 66 or keyboard wedge 58. FIG. 3 also includes a label printer 72.

In operation, the method and system of FIG. 1 are used to accurately identify personal possessions which are recovered after theft or loss by the owners of the possessions. The method and system of FIG. 1 relies upon owners of possessions becoming "members". A member is provided with a unique registration number as well as bar code labels 50. The adhesive bar code labels are small in size and are intended to be affixed to household or consumer products such as cameras, VCR's, televisions, cellular phones, brief cases, bicycles, artwork, radios and soforth. The bar code labels 50 are printed from a label printer 72. Such labels may either be printed in advance and provided as a set to a particular member or may be available at a point of purchase of certain consumer products for application to the product at the time of sale. The host system 18 contains the member database 36 which stores the registration numbers assigned to members.

An associated database 37 also contains information corresponding to the bar code labels 50 which have been used by each particular member to identify that member's possessions. In the preferred embodiment of the invention, the database resides on a UNIX platform powered by a PENTIUM (trade-mark) server. This environment is selected in order to provide fast access to the database records. Other hardware and software configurations are also possible which are able to ensure adequate performance of the database.

The member database 36 may updated on a daily basis from a central membership database (not shown), or mirrored with a second database (not shown) in order to achieve an adequate level of data security. The label database 37 is accessed by the UNIX software 34 which is written in FoxBase+ (trade-mark) for UNIX. The member database 36 is accessed by WINDOWS software 35 which in the preferred embodiment is FoxPro for Windows (trade-mark). The FoxBase+ UNIX software 34 provides a database management system for the master label database which permits the storage and retrieval of information corresponding to all registered labels and their associated member registration numbers. The Windows portion of the software integrates information received from the remote system 10, as described in detail below and manages the member information as stored in the member database 36.

The label database structure 37 is designed to be secure. The method of access described below enables the security to be maintained. Information is stored in the form of "license plate" keys. Such information is meaningless to all remote users as such license plate keys do not contain any membership information. In addition, in the preferred embodiment, the data transmissions which occur between the host system 18 and the remote system 10 may be encryped using a secure encryption scheme, examples of which are known to those skilled in the art.

In the preferred embodiment of the invention the scanning hardware 14 is a PDF 417 scanner/decoder (scanner 54 and decoder 56 in FIG. 3). The hardware requirements for the remote system 10 of the preferred embodiment include DOS support with two megabytes of random access memory, two megabytes storage space, a serial port and a serial modem (RF or AT compatible). The software 42 in the remote system 10 allows remote scanning units to communicate with the host system 18 to obtain a member reference number for item identification. As is known to those skilled in the art, software 42 comprises computer code capable of generating queries for the host system 18 which are passed to the label database 37 via communications network 16.

Each member is provided with an identification card 52 having the registration number of the member.

According to the method of the invention, at or soon following, the time that a particular item is purchased, a bar code label from the set 50 is affixed to the possession. The code on the label is read using the scanner 54; the label is "Track-Scanned" by a laser scanning device 54 that reads the bar coded information. Immediately following this, the identification card 52 is also scanned. The information scanned from the bar code label 50 and the identification card 52 is translated into an analog signal. The analog signal is sent to the decoder for conversion to a digital signal using the decoder 56. Without use of the decoder 56 the bar code labels 50 are not intelligible. The format of the bar code, and the operation of the decoder which depends on this format, is a commercially available two-dimensional bar code designed by Symbol Technologies Inc.

In the preferred embodiment, the two dimensional bar code designed by Symbol Technologies Inc., Bohemia, N.Y., is used. The PDF 417 protocol is used which allows stitching of partial scans, error detection, error correction and the ability to select a security level such that 100% of the information is recoverable in cases where 60% or less of the code is destroyed. The PDF 417 protocol has four predefined modes—ASCI, ALFA, MIXED, and NUMERIC. Every PDF 417 symbol is composed of a series of rows, each using a (17, 4, 6) code with 17 modules arranged into four bars and four spaces with no bar or space having a width greater than six. The set of code words is partitioned into three mutually exclusive subsets called clusters. Each row uses only one of the three clusters to encode data. Each cluster repeats sequentially every third row. Because any two adjacent rows use different clusters, the decoder can stitch partial scans while decoding a very high density code PDF 417 symbol. PDF 417 uses the same start and stop code words for all rows so that the symbol is bounded from the left and the right by solid structures. The last code word of each row is a row check sum.

The number of possible code words for each cluster is 929. Stacked bar codes offer a way for increasing the density of information under the constraint that the symbol be printed in a limited rectangular area. PDF 417 has a high density because it allows scanning lines to cross data rows. This requires more powerful processing in order to stitch together the partial scans. This processing power is within the limits of the current technology.

The information obtained following decoding by decoder 56 is forwarded to the central computer 70 (in the host system 18). This transmission of data may occur in two ways. Data from the decoder 56 may be input into a personal computer 60 (in remote system 10) via a keyboard wedge 58. From the personal computer 60, the data is transferred via modem 62 over telephone lines to the modem 64 of the central computer 70. The personal computer 60 may also display the information received from the scanner 54, but in "licence plate" form rather than the customer profile information.

The second method of data transfer is for the data to be sent from the decoder 56 to the central computer 70 by way of a radio frequency modem 66 which is connected directly to decoder 56. In this case, central computer 70 has a radio frequency modem 68 for receipt of the data and input into central computer 70.

In the central computer 70 (in host system 18) a file is maintained in database 36 which maintains a relationship between the member having identification card 52 and the item being purchased and having one of bar code labels 50 affixed to it.

The central computer 70 may also have transferred to it information relating to the original price, description, serial number, style, colour and so forth of the item being purchased at the time of purchase. In the preferred embodiment, such detailed information is stored in a central membership database (not shown) which is connected to the database 36. The host system 18 may, by way of software 34, access information stored on the central membership database.

Other information pertaining to members may also be stored in the central membership database. In the preferred embodiment, members are assigned priority levels. The priority level of the member and the required or preferred method of return of a recovered article may also be stored in the central membership database and may be temporarily stored (or in some instances permanently stored) in central computer 70.

The method of the invention provides for the identification of a given item having one of the bar code labels 50 affixed to it, by way of accessing the central computer 52. Should such an item be lost or stolen and subsequently recovered, the bar code label may be scanned at the remote system 10 by scanning hardware 14 (scanner 54 and decoder 56). The information scanned is then decoded. In the preferred embodiment, there are two alternatives once the data has been decoded. The data may be processed by the decoder into a suitable input signal for the RF (radio frequency) modem 66. The RF modem 66 will then transmit by RF signals to RF modem 68. The output signal from RF modem 68 will be input to central computer 70.

Alternatively, a recovery file is created by the personal computer 60 (the software 42 provides this functionality). The recovery file is transferred to the host system 18 by gateway 32, communications network 16 and gateway 30.

When the query from the remote system 10 is received at the gateway 30 in the host system 18, the query is processed by UNIX software 34 to obtain information from the label database 37. When the remote system 10 has data corresponding to a bar code which has been scanned into the remote system 10, the bar code data may be transmitted to the host system 18 and used in that system to obtain the member number which corresponds to that bar code. The member number is then able to be passed back to the remote system 10. Because the label database 37 contains only the bar code information and the member number, other member information (such as member telephone number and member address) is not available to the remote system 10. In this sense the label database 37 is secure.

When the remote system 10 provides data to the host system 18 which indicates that a possession has been recovered, the UNIX software 34 writes the member number corresponding to the bar code of the recovered item to a memory location in the host system 18 distinct from the label database 37. The WINDOWS software 35 polls the memory location to determine whether a member number has been written to the memory location.

The WINDOWS software 34 is able to obtain other member information from the member database 36 by way of the member number key. The host system 18 is therefore able to integrate the recovery file as it is received by the host system 18 to facilitate follow-up with the member who is shown in database 36 to be associated with the recovered possession. Information is then provided to the member services system 20 in order that the member be notified of the recovery of the item.

Should the item not be recovered, the files in the central computer 70 (i.e. database 36) may be accessed in order to provide accurate information to the owner for use in making an insurance claim. Access to the database 36 is provided by member services system 20. Information stored in the database 34 may also provide information regarding the preferred method of return of a recovered item.

Other embodiments and variations of the invention are possible. For example, although it is preferred that the information relating to an item being purchased be communicated from the personal computer to a central computer by modem 11, other modes of communication are possible. All such modifications and embodiments are believed to be within the sphere and scope of the present invention as described herein.

I claim:

1. A system for identifying personal possessions belonging to a plurality of owners, comprising a set of labels, each label bearing a predetermined identifying insignia, each identifying insignia corresponding to a unique owner, means for affixing selected ones of the set of labels to selected ones of the personal possessions, means for storing, at a first location, a set of owner identifiers, each owner identifier corresponding to a unique owner, and for each owner identifier stored, a set of identifying data, each identifying data corresponding to the identifying insignia on one of the set of labels, means for inputting, at a second location remote from the first, identifying data corresponding to the identifying insignia on a selected one of the set of labels affixed to a personal possession, means for transmitting the input identifying data to the first location and for receiving at the second location an owner identifier corresponding to the input identifying data transmitted to the first location, means for receiving at the first location the input identifying data transmitted from the second location, means for comparing the input identifying data with at least one of the set of identifying data stored in the means for storing at the first location and where the input identifying data matches the at least one of the set of identifying data, retrieving the owner identifier corresponding to the input identifying data and means for displaying the retrieved owner identifier.

2. The system for identifying personal possessions of claim 1 in which the identifying insignia comprises bar codes.

3. The system for identifying personal possessions of claim 2 in which the bar codes comprise a PDF 417 protocol bar code.

4. The system for identifying personal possessions of claim 1 in which the means for storing the set of owner identifiers and the set of identifying data comprises a first relational database.

5. The system for identifying personal possessions of claim 1 further comprising a means for storing owner data records independent of the set of identifying data and a means for accessing the owner data records by a selected one of the set of owner identifiers.

6. The system for identifying personal possessions of claim 4 in which the means for storing owner data comprises a relational database.

7. The system for identifying personal possessions of claim 6 further comprising a means utilizing a first software program for writing the retrieved owner identifier to a memory location, a means utilizing a second software program for reading the retrieved owner identifier from the memory location, and means for displaying an owner data record accessed by a means for accessing owner data records, the accessed owner data record corresponding to the retrieved owner identifier.

8. The system for identifying personal possessions of claim 7 in which the means for comparing the input identifying data and retrieving the owner identifier comprises the first software program which is accessible at the second location, and in which the means for reading the retrieved owner identifier and the means for accessing owner data records comprises the second software program which is accessible only at the first location.

9. The system for identifying personal possessions of claim 7 in which the means for reading the retrieved owner identifier comprises means for polling the memory location to determine if the retrieved owner identifier has been written to the location.

10. The system for identifying personal possessions of claim 1 in which the means for inputting identifying data comprises a scanner and a decoder.

11. The system for identifying personal possessions of claim 10 in which the scanner comprises a bar code scanner.

12. The system for identifying personal possessions of claim 1 in which the means for transmitting the input identifying data comprises a modem connected to a public telephone network.

13. The system for identifying personal possessions of claim 1 in which the means for transmitting the input identifying data comprises a radio frequency transmitter.

14. The system for identifying personal possessions of claim 1 in which the means for receiving the input identifying data at the first location comprises a gateway to a computer running the UNIX operating system.

15. The system for identifying personal possessions of claim 13 in which the means for receiving the input identifying data at the first location comprises a radio frequency receiver.

16. The system for identifying personal possessions of claim 1 further comprising a means for displaying the retrieved owner identifier at the second location.

17. A method for identifying personal possessions belonging to a plurality of owners, comprising the steps of:
   (a) providing a set of labels, each label bearing a predetermined identifying insignia, each identifying insignia corresponding to a unique owner,
   (b) affixing selected ones of the set of labels to selected ones of the personal possessions,
   (c) storing, at a first location,
      a set of owner identifiers, each owner identifier corresponding to a unique owner, and
      for each owner identifier stored, a set of identifying data, each identifying data corresponding to the identifying insignia on one of the set of labels,
   (d) inputting, at a second location remote from the first, identifying data corresponding to the identifying insignia on a selected one of the set of labels affixed to a personal possession,
   (e) transmitting the identifying data to the first location and receiving at the second location an owner identifier corresponding to the input identifying data transmitted to the first location,
   (f) receiving at the first location the input identifying data from the second location,
   (g) comparing the input identifying data with at least one of the set of identifying data stored in the means for storing and where the input identifying data matches the at least one of the set of identifying data, retrieving the owner identifier corresponding to the input identifying data, and
   (h) displaying the retrieved owner identifier.

18. The method for identifying personal possessions of claim 17 in which the identifying insignia comprises bar codes.

19. The method for identifying personal possessions of claim 18 in which the bar codes comprise codes in a two-dimensional format.

20. The method for identifying personal possessions of claim 17 in which affixing selected ones of the set of labels comprises the step of making contact between an adhesive applied to one side of the selected ones of the labels and the selected ones of the personal possessions.

21. The method for identifying personal possessions of claim 17 in which the set of owner identifiers and the set of identifying data are stored in a relational database.

22. The method for identifying personal possessions of claim 17 in which the identifying data is input by a scanner and a decoder.

23. The method for identifying personal possessions of claim 22 in which the scanner comprises a bar code scanner.

24. The method for identifying personal possessions of claim 17 in which the input identifying data is transmitted by a modem connected to a public telephone network.

25. The method for identifying personal possessions of claim 17 in which the input identifying data is transmitted by a radio frequency transmitter.

26. The method for identifying personal possessions of claim 17 in which the input identifying data is received at the first location by a gateway to a computer running the UNIX operating system.

27. The method for identifying personal possessions of claim 21 further comprising the step of storing, at the first location, owner data records.

28. The method for identifying personal possessions of claim 27 in which the retrieved owner identifier is written to a memory location utilizing a first software program, the retrieved owner identifier is later read from the memory location utilizing a second software program, and one of the owner data records accessed by a means for accessing owner data records is displayed, the accessed one of the owner data records corresponding to the retrieved owner identifier.

29. The method for identifying personal possessions of claim 28 in which the step of comparing the input identifying data and retrieving the owner identifier is performed by the first software program which is accessible at the second location, and in which the steps of reading the retrieved owner identifier and accessing the owner data records is performed by the second software program which is accessible only at the first location.

30. The method for identifying personal possessions of claim 28 in which the step of reading the retrieved owner identifier comprises the step of polling the memory location to determine if the retrieved owner identifier has been written to the location.

* * * * *

UNITED STATES PATENT AND TRADEMARK OFFICE
CERTIFICATE OF CORRECTION

PATENT NO. : 5,841,116
DATED : November 24, 1998
INVENTOR(S) : Bruce Lewis

It is certified that error appears in the above-identified patent and that said Letters Patent is hereby corrected as shown below:

Claim 17 Column 9 Line 19 after "transmitting the" insert --input--.

Signed and Sealed this

Twentieth Day of July, 1999

Attest:

Attesting Officer

Q. TODD DICKINSON

Acting Commissioner of Patents and Trademarks